United States Patent
Aboujaoude et al.

(10) Patent No.: US 8,144,853 B1
(45) Date of Patent: Mar. 27, 2012

(54) METHODS, SYSTEMS, AND DEVICES FOR PROVIDING CONTACT INFORMATION

(75) Inventors: Roger Aboujaoude, Ocean Township, NJ (US); Hossein Eslambolchi, Los Altos Hills, CA (US); John McCanuel, Bailey, CO (US); Saeid Shariati, Annandale, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1184 days.

(21) Appl. No.: 11/048,832

(22) Filed: Feb. 2, 2005

(51) Int. Cl.
 *H04M 3/42* (2006.01)
(52) U.S. Cl. ......... 379/201.05; 379/201.06; 379/207.04; 370/352; 455/412.1; 455/414.1; 455/418
(58) Field of Classification Search . 379/201.01–201.05
See application file for complete search history.

(56) References Cited

U.S. PATENT DOCUMENTS

| | | | | |
|---|---|---|---|---|
| 5,960,442 | A * | 9/1999 | Pickering | 707/104.1 |
| 6,766,162 | B1 * | 7/2004 | Beamish | 455/412.1 |
| 6,804,509 | B1 * | 10/2004 | Okon et al. | 455/414.1 |
| 7,269,162 | B1 * | 9/2007 | Turner | 370/352 |
| 7,555,108 | B2 * | 6/2009 | Sylvain | 379/207.02 |
| 2001/0055308 | A1 * | 12/2001 | Afrakhteh et al. | 370/401 |
| 2003/0235187 | A1 * | 12/2003 | Iwama et al. | 370/352 |
| 2004/0170263 | A1 * | 9/2004 | Michael et al. | 379/201.1 |
| 2005/0288006 | A1 * | 12/2005 | Apfel | 455/418 |

* cited by examiner

*Primary Examiner* — Fan Tsang
*Assistant Examiner* — Ibraham Sharifzada
(74) *Attorney, Agent, or Firm* — Akerman Senterfitt; Michael K. Dixon; Roy Zachariah

(57) ABSTRACT

Certain exemplary embodiments comprise a method, comprising storing, within a telecommunications network, contact information for each of a plurality of contacts, the contact information for at least one of the plurality of contacts comprising a telephone availability status; and updating the telephone availability status for said at least one of the plurality of contacts.

24 Claims, 3 Drawing Sheets

METHODS, SYSTEMS, AND DEVICES FOR PROVIDING CONTACT INFORMATION

BACKGROUND

A typical cell phone user can store information regarding their contacts on their phone or on a Subscriber Information Module (SIM) card that can be used with the phone. Typically, this contact list is static and only available via the cell phone. If the user changes phones or borrows someone's phone, substantial effort is typically required to access the contact list. Moreover, the contact list is static in that the user is provided no information regarding the current telephone availability of each person on the contact list. That is, the user does not know if the contact's telephone is out of reach, turned off, busy, declared busy, etc.

BRIEF DESCRIPTION OF THE DRAWINGS

A wide variety of potential embodiments will be more readily understood through the following detailed description of certain exemplary embodiments, with reference to the accompanying exemplary drawings in which.

DETAILED DESCRIPTION

Certain exemplary embodiments provide a method to store a contact list on a data server coupled to a network. That contact list is available for access, revisions, and/or sharing, etc. in real time to any authorized device that can couple to the network, directly and/or indirectly. Once stored on the server, the contact list can be updated with the current telephone availability status of the telephones of one or more contacts on the list.

Certain exemplary embodiments cause the telephone availability status to be updated only when a user accesses the list. Certain exemplary embodiments cause the telephone availability status to be updated automatically, periodically, aperiodically, continuously, on-demand, and/or in real-time, etc.

Via certain exemplary embodiments, when a user attempts to utilize their telephone and/or access a contact list stored on that telephone, the contact list is updated from the server. Via certain exemplary embodiments, when a user attempts to utilize their telephone and/or access a contact list stored on that telephone, the telephone availability status is updated via a connection to the network and/or the server. In certain exemplary embodiments, if the user is out of range, the phone can resort back to the most recent version of the contact list stored on the phone. Otherwise, the list can be extracted from the network and/or the server, loaded into a memory of the phone, and rendered to the user. Once the user perceives the telephone availability status of a contact, the user can decide to proceed or not to proceed with a call to that contact.

Because the contact list can be stored on a network-based server, the user can access the contact list from any of many different types of information devices, and/or share the list with others in a secure fashion.

Certain exemplary embodiments comprise a method comprising storing, within a telecommunications network, contact information for each of a plurality of contacts, the contact information for at least one of the plurality of contacts comprising a telephone availability status; updating the telephone availability status for said at least one of the plurality of contacts; automatically providing, to a telephone coupled to the telecommunications network, the telephone availability status for said at least one of the plurality of contacts; and causing the telephone to render, to a user of the telephone, the telephone availability status for said at least one of the plurality of contacts.

Figure 1:
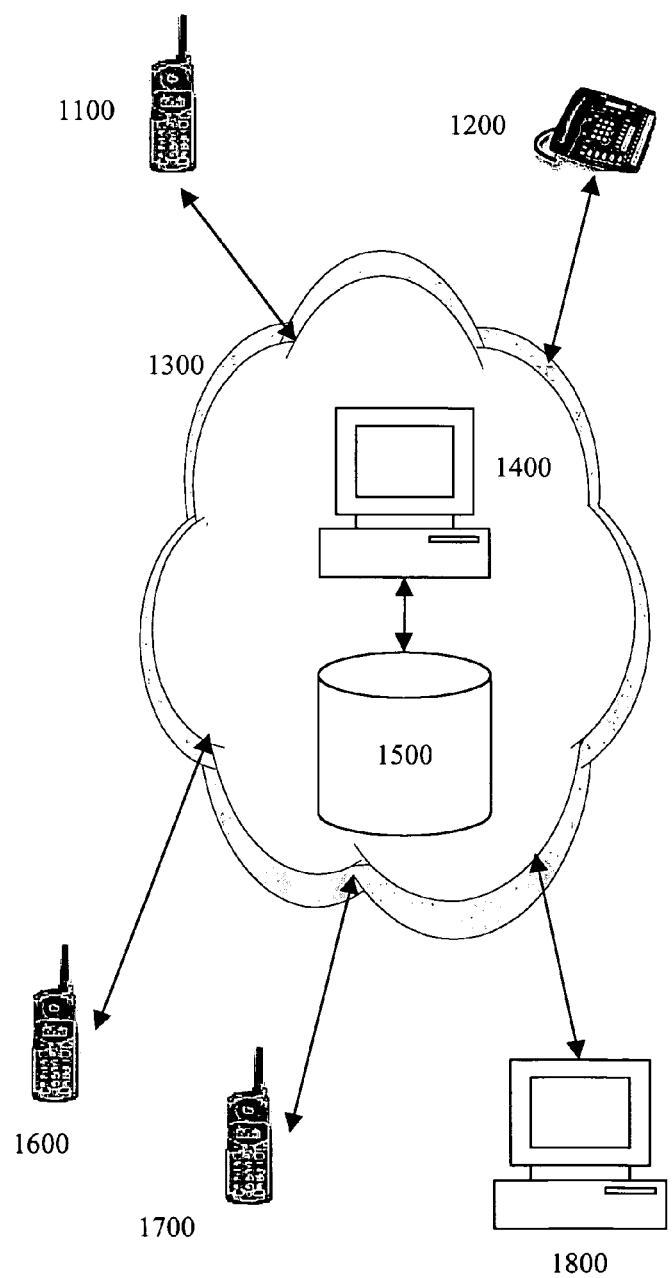
FIG. 1 is a block diagram of an exemplary embodiment of a system 1000.

FIG. 1 is a block diagram of an exemplary embodiment of a system 1000, which can comprise any number of cellular telephones 1100, 1600, 1700. System 1000 can comprise any number of traditional telephone 1200. System 1000 can comprise any number of computers 1800. Any of telephones 1100, 1200, 1600, 1700, and computer 1800 can be coupled to a network 1300. Within network 1300 can be a data server 1400, which can be coupled to a database 1500 that can store contact information and/or telephone availability status.

Any of telephones 1100, 1200, 1600, 1700, and computer 1800 can provide access, revise, request, retrieve, process, and/or render contact information stored via data server 1400 and/or database 1500. Any of telephones 1100, 1200, 1600, 1700, and computer 1800 can access, request, retrieve, process, and/or render telephone availability status from network 1300, data server 1400, and/or database 1500.

To obtain a telephone availability status, data server 1400 can be coupled to other data resources, located within or outside network 1300, such as a server, database, gatekeeper, Location Register, Home Location Register, Visitor Location Register, SS7 component, switch, softswitch, router, gateway, central office component, PBX, H.323 database, and/or a database for Voice over Packet (e.g., Voice over IP, Voice over ATM, and/or Voice over Frame Relay, etc.), any of which can request, determine, obtain, store, forward, and/or provide telephone availability status for one or more contacts.

Any of numerous approaches can be utilized for requesting, querying, determining, obtaining, processing, storing, forwarding, and/or providing telephone availability status, including database queries; flag reporting; status commands; and/or messaging, signaling, and/or signaling inspection via SS7, Short Message Service, UDP, IP, ISDN, Q.931, H.323, H.225, SIP, Media Gateway Control (MEGACO), and/or Stream Control Transmission Protocol (SCTP); etc.

Once contact information and/or telephone availability status is provided to any of telephones 1100, 1200, 1600, 1700, and/or computer 1800, that information and/or status can be rendered to a user of the telephone 1100, 1200, 1600, 1700, and/or computer 1800.

Figure 2:
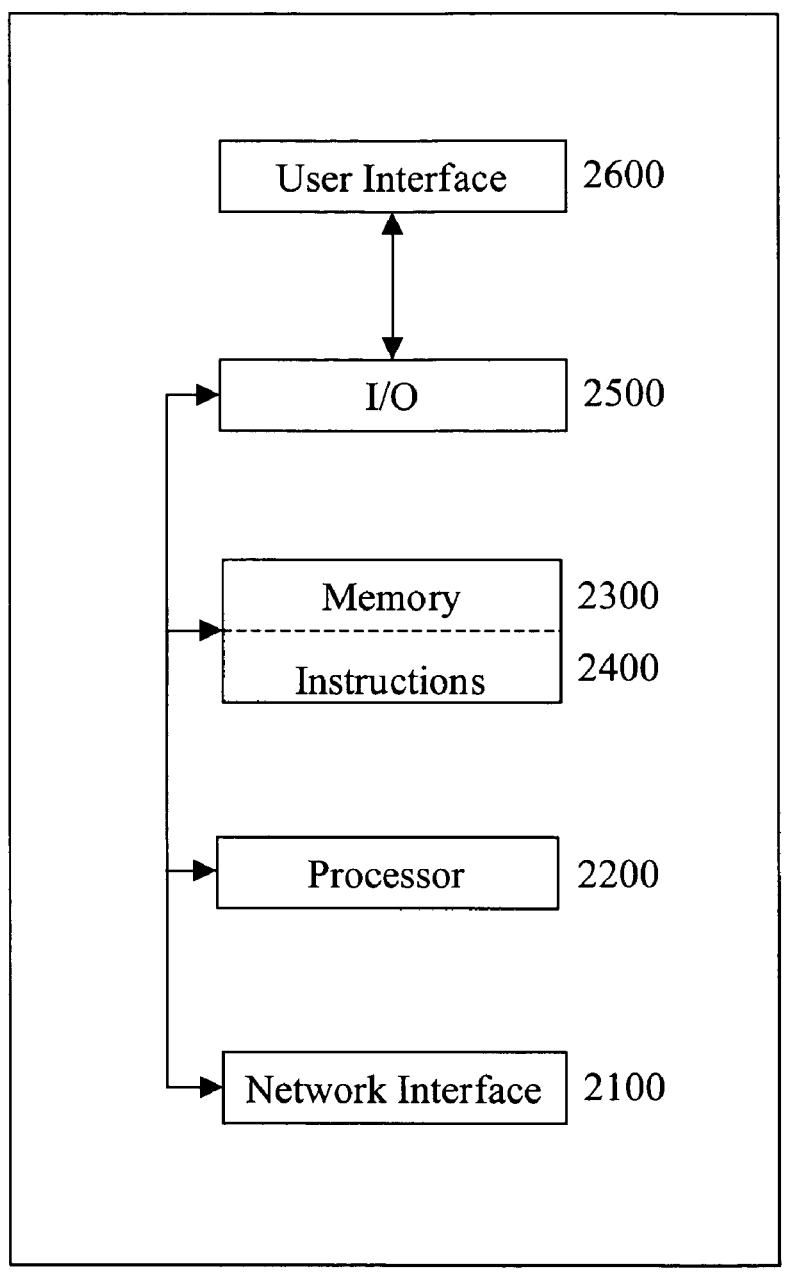
FIG. 2 is a block diagram of an exemplary embodiment of an information device 2000.

FIG. 2 is a block diagram of an exemplary embodiment of an information device 2000, which in certain operative embodiments can comprise, for example, any of telephones 1100, 1200, 1600, 1700, computer 1800, and/or data server 1400 of FIG. 1. Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user can view a rendering of contact information and/or telephone availability status.

Figure 3:
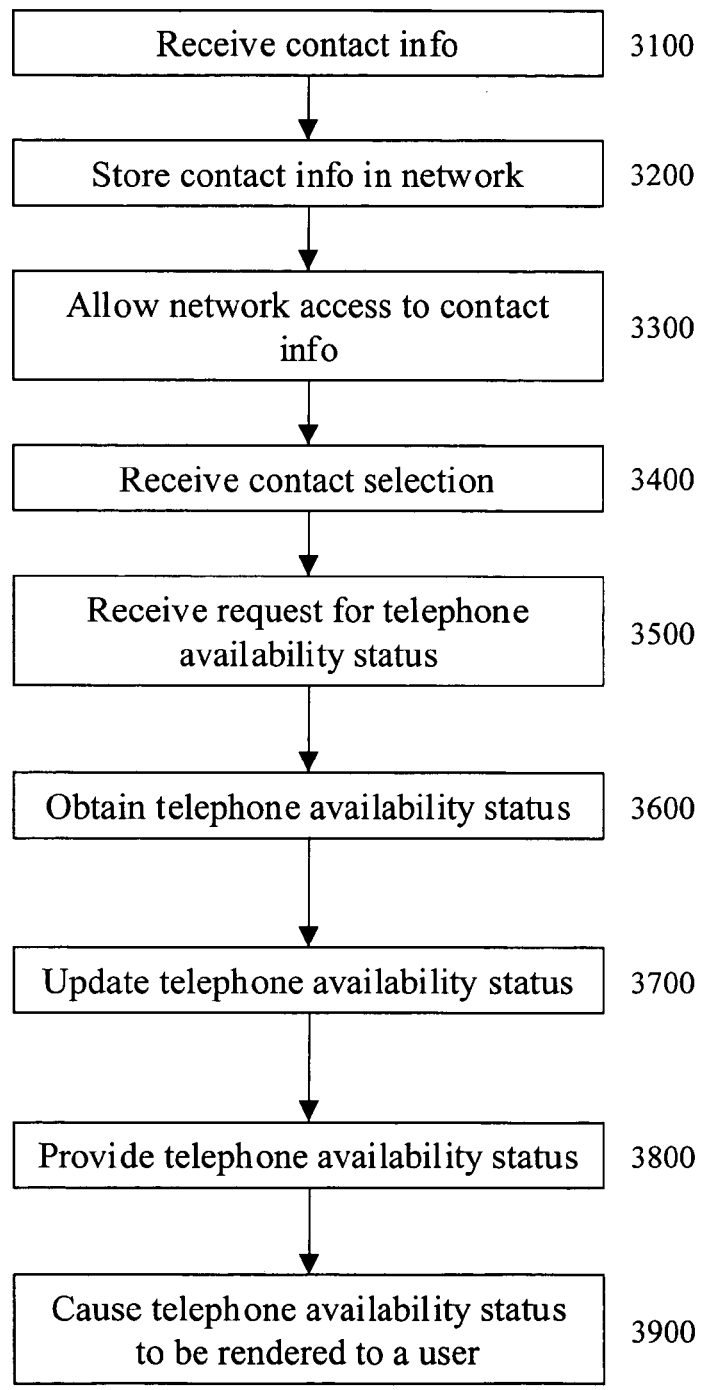
FIG. 3 is a flowchart of an exemplary embodiment of a method 3000.

FIG. 3 is a flowchart of an exemplary embodiment of a method 3000. At activity 3100, a data server and/or database in a network can receive contact information, which can be provided by, for example, a user, another server, and/or retrieved from a database and/or other data resource, either within or outside the network. For example, a user can transfer and/or upload a contact list from a network database, cellular telephone, PDA, laptop computer, and/or personal computer, etc.

At activity 3200, the received contact information can be stored in the network, such as via the data server and/or database. The contact information can be stored centrally, distributedly, and/or redundantly, etc.

At activity 3300, secure network access can be allowed to the contact information. For example, via a list, such as an access control list, a first user can allow other specified users and/or information devices to access that first user's contact information for viewing, retrieval, editing, transferring, etc. Access can be specified by any of numerous parameters, such as name, username, telephone number, MIN, MAC address, IP address, password, certificate, key, etc.

At activity 3400, one or more contacts can be identified to the network, data server, and/or database. For example, a particular contact can be selected by a user and an identification of that selected contact provided to the network, data server, and/or database. In response, any updated information for that contact can be provided by the network, data server, and/or database. For example, upon receiving an identification of a selected contact, the network, data server, and/or database can provide to the identifying device any updated information regarding that contact. As another example, when a user accesses an information device and/or a contact list, a request for an update of the entire and/or any portion of the contact list can be generated and fulfilled.

At activity 3500, a request for telephone availability status can be received by the network, data server, and/or database. The request can be generated for the telephone availability status of a contact when, for example, a user of an information device accesses contact information for and/or selects that contact. As another example, the network, data server, and/or database can generate the request. Any request can be generated automatically, periodically, aperiodically, continuously, on-demand, in real-time, etc.

At activity 3600, the network, data server, and/or database can obtain the telephone availability status for the accessed, selected, and/or requested contact.

At activity 3700, the telephone availability status can be stored and/or updated in the network, data server, and/or database. For example, the telephone availability status can be stored with the contact information. The telephone availability status can be obtained and/or updated automatically, periodically, aperiodically, continuously, on-demand, and/or in real-time, etc.

At activity 3800, the telephone availability status can be provided by the network, data server, and/or database to the requesting information device. Alternatively, the telephone availability status can be provided can be provided from another data resource, at the request and/or command of the network, data server, and/or database. The telephone availability status can be provided automatically, periodically, aperiodically, continuously, on-demand, and/or in real-time, etc.

At activity 3900, receipt of the telephone availability status and/or instructions provided therewith can cause the receiving information device to render the telephone availability status to a user of the receiving information device. The telephone availability status can be rendered visually, audibly, tactilely, and/or haptically, etc. Upon perceiving the rendered telephone availability status of a contact of interest, a user can decide whether to place a call or to send another type of message to that contact, such as a voicemail, e-mail, page, instant message, fax, etc.

If the telephone availability status of a contact of interest is a particular status, such as busy or out-of-range, a predetermined non-call message can be generated and/or transmitted to the contact of interest.

If the telephone availability status of a contact of interest is a particular status, such as busy or out-of-range, a timer can be set and the telephone availability status checked again at the expiration of the timer. Alternatively, the telephone availability status can be repeatedly checked and/or updated, such as periodically, aperiodically, continuously, on-demand, etc. The repetitions can continue for a predetermined, user-specified, and/or contact-specified period, until the user requests they cease, until the status changes (such as to available), and/or until a call is successfully placed to the contact, etc.

When the telephone availability status of a contact of interest changes to available, the user's information device can notify the user of the device in any manner, such as via speaking a message; playing one or more tones and/or tunes; flashing a light and/or icon; displaying an icon, photo, and/or animation; vibrating the information device and/or a portion thereof; providing a call and/or message (e.g., voicemail, e-mail, page, instant message, fax, etc.); etc.

When the following terms are used herein, the accompanying definitions apply:

access—permission, liberty, or ability to enter, approach, communicate with and/or through, and/or pass to and/or from a place, thing, and/or person.

adapted to—made suitable or fit for a specific use or situation.

allow—to let do or happen; to permit.

aperiodically—occurring at irregular and/or generally unpredictable intervals.

apparatus—an appliance or device for a particular purpose authorized network access—sanctioned access via a telecommunications network.

automatically—acting or operating in a manner essentially independent of external influence or control. For example, an automatic light switch can turn on upon "seeing" a person in its view, without the person manually operating the light switch.

call—(n.) a voice communication via telephone.

can—is capable of, in at least some embodiments.

Cellular Radio System—a technique for mobile radio telephone wherein a service area is subdivided into a grid of small units (cells). Each cell has its own transmitter/receiver to service only that area. As the mobile user moves from cell to cell, the control of the land-line portion of the call is automatically passed to the next call facilities.

comprising—including but not limited to.

connectable—made suitable or fit for joining to or by means of a communications circuit.

connection—a tangible link.

contact information—data regarding each of a plurality of individuals and/or groups (such as departments, organizations, and/or businesses, etc.), the data for each individual and/or group comprising an identifier of the individual and/or group, and one or more telephone numbers, e-mail addresses, and/or physical addresses.

contact list—an organized grouping of contact information for a plurality of individuals and/or groups.

contacts—an individual and/or group for which contact information is available.

continuously—occurring without substantial interruption.

couple—to join, connect, and/or link together.

coupleable—capable of being joined, connected, and/or linked together.

data—distinct pieces of information, usually formatted in a special or predetermined way and/or organized to express concepts.

determine—to establish or ascertain definitely, such as after consideration, investigation, or calculation.

display—(v.) to visually render. (n.) an electronic device that represents information in visual form and/or a visual representation of something.

facilitate—to help bring about.

in real-time—occurring immediately and/or with a delay of no more than about 1 second.

instructions—directions adapted to perform a particular operation or function.

link—a channel for communication.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

network—a communicatively coupled plurality of nodes.

network access—access via a telecommunications network.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

node—a communication device within a network that is coupled to another node within the network via a link. A CPE telephony device and/or gateway is not considered a node.

non-cellular—not utilizing the Cellular Radio System.

on-demand—occurring in response to a request.

operative—being in effect; operating.

periodically—occurring at regular and/or generally predictable intervals.

Plain Old Telephone Service (POTS)—the basic analog voice service supplying standard single line telephones, telephone lines, and access to the public switched network. Excludes technologies such as ISDN, digital phones, cellular phones, and DSL.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can be a central processing unit, a local controller, a remote controller, parallel controllers, and/or distributed controllers, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to make available; to supply; to prepare.

public switched telephone network (PSTN)—the world's interconnected voice-oriented system of telephone switches and lines used for providing telecommunication services to the general public.

receive—to take, obtain, and/or acquire.

render—to display, annunciate, speak, print, and/or otherwise make perceptible to a human.

render—to make perceptible to a human.

represent—to describe and/or symbolize.

request—(v.) to express a need and/or desire for; to inquire and/or ask for. (n.) that which communicates an expression of desire and/or that which is asked for.

server—an information device and/or software that provides some service for other information devices connected to it via a network. A common example is a file server, which has a local disk and services requests from remote clients to read and write files on that disk. A server can also provide access to resources, such as programs, shared devices, etc.

set—a related plurality.

store—to enter and/or copy into and/or onto a machine-readable medium.

substantially—to a great extent or degree.

system—a collection of mechanisms, devices, data, and/or instructions, the collection designed to perform one or more specific functions.

telecommunications—the science and technology of communication at a distance by transmission of impulses.

telephone—an instrument that converts voice and other audio signals into a form that can be transmitted to remote locations and that receives and reconverts information from a transmittable form into voice and/or other audio signals.

telephone availability status—an indication of whether a telephone associated with a telephone number included in contact information for an identified contact is available to receive a call or unavailable to receive a call due to, for example, being out of reach, turned off, busy, declared busy, etc.

telephony—the art or process of transmitting speech at a distance.

update—to make current.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

within a telecommunications network—in a repository coupled to a server that is coupled to an intermediate node (e.g., a router and/or switch) of a telecommunications network.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for providing contact information, comprising:
    storing, in a telecommunications network, contact information for each of a plurality of contacts, the contact information for at least one of the plurality of contacts comprising a telephone availability status;
    updating the telephone availability status for the at least one of the plurality of contacts based upon an activation of the contract information;
    automatically providing, to a telephone coupled to the telecommunications network, the telephone availability status for the at least one of the plurality of contacts and an updated list of the plurality of contacts stored on the telephone, the telephone adapted to convert audio signals into a form transmittable via a public switched telephone network;
    causing the telephone to render, to a user of the telephone, the telephone availability status for the at least one of the plurality of contacts; and
    responsive to an indication from a first user, securely sharing the contact information and the updated telephone availability status with an information device operated by a second user, wherein the information device is not a telephone.

2. A method for providing contact information, comprising:
    storing, in a telecommunications network, contact information for each of a plurality of contacts, the contact information for at least one of the plurality of contacts comprising a telephone availability status;
    updating the telephone availability status for the at least one of the plurality of contacts, based upon an activation of the contract information, only when a first or second user accesses a list of the plurality of contacts, and providing to a telephone the updated list of the plurality of contacts stored on the telephone, the telephone adapted to convert audio signals into a form transmittable via a public switched telephone network; and
    responsive to an indication from the first user, securely sharing the contact information and the updated telephone availability status with an information device operated by the second user, wherein the information device is not a telephone.

3. The method of claim 2, further comprising:
    requesting the contact information for each of the plurality of contacts, responsive to a determination that the telephone is out of range, the telephone adapted to resort back to a most recent version of a contact list.

4. The method of claim 2, further comprising:
    receiving the contact information for each of the plurality of contacts.

5. The method of claim 2, further comprising:
allowing authorized network access to the contact information for each of the plurality of contacts, the access specified by a Media Access Control address.

6. The method of claim 2, further comprising:
receiving a selection of the at least one of the plurality of contacts.

7. The method of claim 2, further comprising:
via Media Gateway Control signals, requesting the telephone availability status for the at least one of the plurality of contacts.

8. The method of claim 2, further comprising:
via H.323 signals, receiving the telephone availability status for the at least one of the plurality of contacts.

9. The method of claim 2, further comprising:
via H.225 signals, determining the telephone availability status for the at least one of the plurality of contacts.

10. The method of claim 2, further comprising:
allowing authorized network access to the telephone availability status for the at least one of the plurality of contacts.

11. The method of claim 2, wherein:
responsive to a status of the at least one of the plurality of contacts being out-of-range a timer is set, the telephone availability status for the at least one of the plurality of contacts is updated periodically via the timer.

12. The method of claim 2, wherein:
the telephone availability status for the at least one of the plurality of contacts is updated aperiodically.

13. The method of claim 2, wherein:
the telephone availability status for the at least one of the plurality of contacts is updated continuously.

14. The method of claim 2, wherein:
the telephone availability status for the at least one of the plurality of contacts is updated on-demand.

15. The method of claim 2, wherein:
responsive to a status of the at least one of the plurality of contacts being out-of-range a timer is set, the telephone availability status for the at least one of the plurality of contacts is updated in real-time via the timer; and
repetitions of checking the telephone availability status are caused to cease by one of:
a request by the user for a cessation thereof;
a status change of the telephone availability status for the at least one of the plurality of contacts; or
a determination that a call is successfully placed to the at least one of the plurality of contacts.

16. The method of claim 2, further comprising:
automatically providing the contact information for each of the plurality of contacts.

17. The method of claim 2, further comprising:
automatically providing the telephone availability status for the at least one of the plurality of contacts.

18. The method of claim 2, further comprising:
automatically providing, to a user of a telephone coupled to the telecommunications network, the telephone availability status for the at least one of the plurality of contacts.

19. The method of claim 2, further comprising:
in response to a user of a telephone coupled to the telecommunications network attempting to utilize the telephone, automatically providing to the telephone the telephone availability status for the at least one of the plurality of contacts.

20. The method of claim 2, further comprising:
in response to a user of a telephone coupled to the telecommunications network attempting to access a contact list stored on the telephone, automatically providing to the telephone the telephone availability status for the at least one of the plurality of contacts.

21. The method of claim 2, further comprising:
in response to a user of a telephone coupled to the telecommunications network attempting to access contact information for the at least one of the plurality of contacts, automatically providing to the telephone the telephone availability status for the at least one of the plurality of contacts.

22. The method of claim 2, further comprising:
in response to a user of a telephone coupled to the telecommunications network requesting contact information for the at least one of the plurality of contacts, automatically providing to the telephone the telephone availability status for the at least one of the plurality of contacts.

23. The method of claim 2, further comprising:
automatically causing a telephone coupled to the telecommunications network to render the telephone availability status for the at least one of the plurality of contacts.

24. A non-transitory computer readable medium storing machine readable instruction for providing contact information comprising:
storing, within a telecommunications network, contact information for each of a plurality of contacts, the contact information for at least one of the plurality of contacts comprising a telephone availability status;
updating the telephone availability status for the at least one of the plurality of contacts based upon an activation of the contract information, and providing to a telephone an updated list of the plurality of contacts stored on the telephone, the telephone adapted to convert audio signals into a form transmittable via a public switched telephone network; and
responsive to an indication from a first user, securely sharing the contact information and the updated telephone availability status with an information device operated by a second user, wherein the information device is not a telephone.

* * * * *